(12) United States Patent
Isogai et al.

(10) Patent No.: US 12,394,544 B2
(45) Date of Patent: Aug. 19, 2025

(54) CHIP CERAMIC SEMICONDUCTOR ELECTRONIC COMPONENT

(71) Applicant: Murata Manufacturing Co., Ltd., Nagaokakyo (JP)

(72) Inventors: Keisuke Isogai, Nagaokakyo (JP); Yoshinobu Saki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 351 days.

(21) Appl. No.: 18/115,968

(22) Filed: Mar. 1, 2023

(65) Prior Publication Data

US 2023/0207160 A1 Jun. 29, 2023

Related U.S. Application Data

(63) Continuation of application No. PCT/JP2021/029611, filed on Aug. 11, 2021.

(30) Foreign Application Priority Data

Sep. 17, 2020 (JP) ................. 2020-156746

(51) Int. Cl.
*H01C 1/148* (2006.01)
*H01C 1/14* (2006.01)
*H01C 7/02* (2006.01)

(52) U.S. Cl.
CPC ........... *H01C 1/148* (2013.01); *H01C 1/1406* (2013.01); *H01C 7/027* (2013.01)

(58) Field of Classification Search
CPC ....... H01C 1/148; H01C 1/1406; H01C 7/027
See application file for complete search history.

(56) References Cited

U.S. PATENT DOCUMENTS 6,232,867 B1 * 5/2001 Yoshida ............... H01C 17/285
338/21
8,154,379 B2 * 4/2012 Theissl .................. H01C 17/28
338/307

(Continued)

FOREIGN PATENT DOCUMENTS

EP 3196904 A1 7/2017
JP 2005050895 * 2/2005

(Continued)

OTHER PUBLICATIONS

JP-2005050895 translation (Year: 2005).*

(Continued)

*Primary Examiner* — Kyung S Lee
(74) *Attorney, Agent, or Firm* — Keating & Bennett, LLP

(57) ABSTRACT

A chip ceramic semiconductor electronic component includes a ceramic body including a ceramic semiconductor, and a first surface and a second surface in contact with the first surface, the first outer electrode on the first surface of the ceramic body, and the second outer electrode covering the first outer electrode and extending onto the second surface of the ceramic body, in which an area of a first surface of the first outer electrode is less than about 0.17 mm$^2$, and a hard particle made of a material harder than the first outer electrode is at the interface between the first and second outer electrodes.

20 Claims, 5 Drawing Sheets

(56) References Cited

U.S. PATENT DOCUMENTS

| | | | |
|---|---|---|---|
| 8,194,391 B2 * | 6/2012 | Takeuchi | H01G 4/12 |
| | | | 361/321.2 |
| 9,418,790 B2 * | 8/2016 | Takeuchi | H01G 4/232 |
| 9,840,787 B2 * | 12/2017 | Kitada | H01C 7/042 |
| 2009/0053853 A1 | 2/2009 | Onodera et al. | |

FOREIGN PATENT DOCUMENTS

| | | | |
|---|---|---|---|
| JP | 2005327929 A | | 11/2005 |
| JP | 2008028064 A | | 2/2008 |
| JP | 2009049320 A | | 3/2009 |
| JP | 2009200421 A | | 9/2009 |
| JP | 2012033621 | * | 2/2012 |
| WO | 2016042884 A1 | | 3/2016 |

OTHER PUBLICATIONS

JP-2012033621 translation (Year: 2021).*
Appendix A of JIS C 5101-21, 2014, 1 page.
International Search Report in PCT/JP2021/029611, mailed Nov. 9, 2021, 3 pages.
Written Opinion in PCT/JP2021/029611, mailed Nov. 9, 2021, 3 pages.

* cited by examiner

CHIP CERAMIC SEMICONDUCTOR ELECTRONIC COMPONENT

CROSS REFERENCE TO RELATED APPLICATIONS

This application claims the benefit of priority to Japanese Patent Application No. 2020-156746 filed on Sep. 17, 2020 and is a Continuation application of PCT Application No. PCT/JP2021/029611 filed on Aug. 11, 2021. The entire contents of each application are hereby incorporated herein by reference.

BACKGROUND OF THE INVENTION

1. Field of the Invention

The present invention relates to a chip ceramic semiconductor electronic component, such as thermistors including positive characteristics (or positive temperature coefficient; PTC) thermistors and negative characteristics (or negative temperature coefficient; NTC) thermistors, varistors, and capacitors.

2. Description of the Related Art

In recent years, there has been a need to reduce variations in resistance value between chip ceramic semiconductor electronic components along with development of electronics technology.

International Publication No. 2016/042884 discloses a chip ceramic semiconductor electronic component which includes a ceramic body including a ceramic semiconductor, one pair of first outer electrodes formed on both end surfaces of the ceramic body, and one pair of second outer electrodes formed so as to cover the first outer electrodes and extend on portions of side surfaces of the ceramic body. Each second outer electrode includes a conductive material and a thermosetting resin cured at a temperature of 500° C. or lower.

In the chip ceramic semiconductor electronic component disclosed in International Publication No. 2016/042884, formation of the second outer electrodes with use of a resin material that can be cured at a lower temperature than a temperature for heat treatment, such as baking, allows reduction or prevention of oxidation and/or segregation of metal elements contained in the first outer electrodes. As a result, variations in a rate of change in resistance value before and after mounting in a chip ceramic semiconductor electronic component can be reduced.

If the chip ceramic semiconductor electronic component disclosed in International Publication No. 2016/042884 decreases in size, an area of contact between each first outer electrode and the corresponding second outer electrode decreases to make a fixation strength between the first outer electrode and the second outer electrode likely to decrease. There is concern that an interface between a first outer electrode and a second outer electrode may peel off especially in a chip ceramic semiconductor electronic component the dimensions of which is smaller than the dimensions of the dimensional standard 1005M (Appendix A of JIS C 5101-21: 2014).

SUMMARY OF THE INVENTION

Preferred embodiments of the present invention provide chip ceramic semiconductor electronic components in each of which an interface between a first outer electrode and a second outer electrode is unlikely to peel off despite small dimensions.

According to a preferred embodiment of the present invention, a chip ceramic semiconductor electronic component is provided that includes a ceramic body including a ceramic semiconductor and a first surface and a second surface in contact with the first surface, a first outer electrode on the first surface of the ceramic body, and a second outer electrode covering the first outer electrode and extending onto the second surface of the ceramic body. An area of a first surface of the first outer electrode is less than about 0.17 $mm^2$. A hard particle made of a material harder than the first outer electrode is provided at an interface between the first outer electrode and the second outer electrode.

According to preferred embodiments of the present invention, the hard particle at the interface between the first outer electrode and the second outer electrode provides an anchor effect, and a fixation strength between the first outer electrode and the second outer electrode is improved. For this reason, it is possible to make an interface between a first outer electrode and a second outer electrode unlikely to peel off even in, for example, a chip ceramic semiconductor electronic component the dimensions of which are smaller than the dimensions of the dimensional standard 1005M (Appendix A of JIS C 5101-21: 2014).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A chip ceramic semiconductor electronic component according to a preferred embodiment of the present invention includes a first outer electrode and a second outer electrode that are stacked and provided on each end surface of a ceramic body and includes the feature that hard particles made of a material harder than the first outer electrode are arranged at an interface between the first outer electrode and the second outer electrode. The hard particles arranged at the interface between the first outer electrode and the second outer electrode provide an anchor effect, which allows improvement of a fixation strength between the first outer electrode and the second outer electrode and prevents peeling at the interface between the first outer electrode and the second outer electrode. Preferred embodiments of the present invention are especially suitable for a small-size chip ceramic semiconductor electronic component in which the anchor effect manifests itself prominently.

Preferred embodiments of the present invention will be described in detail below with reference to the drawings.

First Preferred Embodiment

Figure 1:
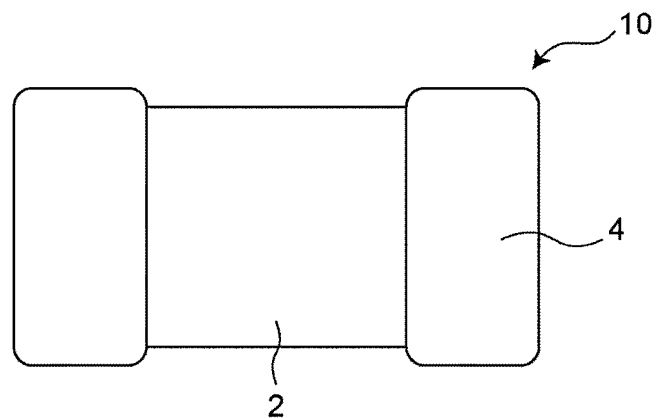
FIG. 1 is a schematic top view of a chip ceramic semiconductor electronic component according to a first preferred embodiment of the present invention.
Figure 2:
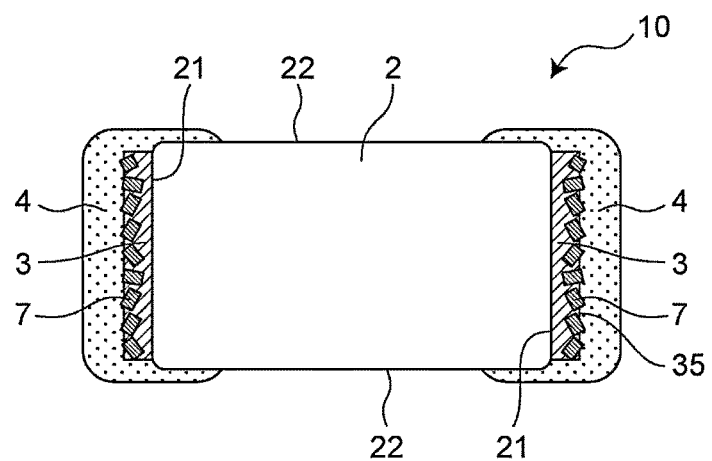
FIG. 2 is a schematic partial sectional view of the chip ceramic semiconductor electronic component shown in FIG. 1.
Figure 3:
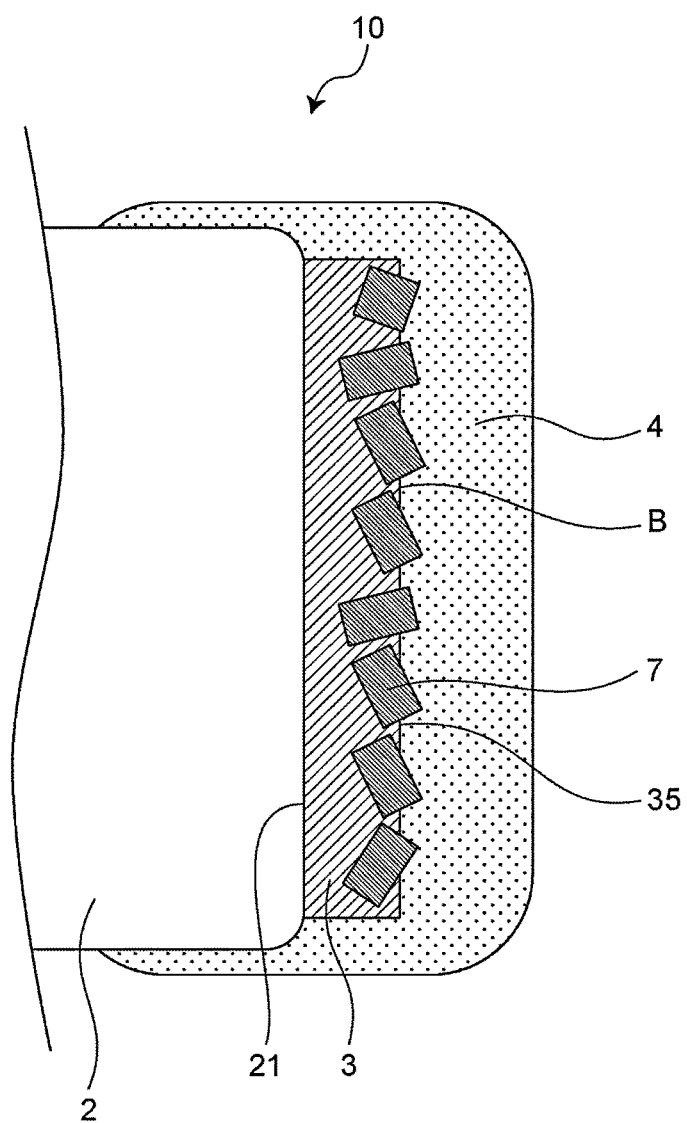
FIG. 3 is a schematic enlarged view of a first outer electrode and a second outer electrode provided on one end surface of a ceramic body in the chip ceramic semiconductor electronic component shown in FIG. 2.

FIG. 1 is a schematic top view of a chip ceramic semiconductor electronic component 10 according to a first preferred embodiment of the present invention. FIG. 2 is a schematic partial sectional view showing sections of first outer electrodes 3 and second outer electrodes 4 in the chip ceramic semiconductor electronic component 10 shown in FIG. 1. FIG. 3 is a schematic enlarged view of the first outer electrode 3 and the second outer electrode 4 provided on one end surface 21 of a ceramic body 2 in the chip ceramic semiconductor electronic component 10.

The chip ceramic semiconductor electronic component 10 includes the ceramic body 2, one pair of first outer electrodes 3 which are provided on respective end surfaces 21 and 21 facing each other of the ceramic body 2, and one pair of second outer electrodes 4 which cover the first outer electrodes 3 and extend onto side surfaces 22 of the ceramic body 2. The end surfaces 21 and 21 are first surfaces of the ceramic body 2. The side surfaces 22 are second surfaces of the ceramic body 2 which are in contact with the end surfaces 21 and 21 as the first surfaces.

As shown in detail in FIG. 3, the chip ceramic semiconductor electronic component 10 further includes a hard particle 7 which is made of a material harder than the first outer electrodes 3. The hard particle 7 is provided at an interface B between the first outer electrode 3 and the second outer electrode 4.

Since the hard particle 7 defines and functions as an anchor which bonds the first outer electrode 3 and the second outer electrode 4 together, a fixation strength between the first outer electrode 3 and the second outer electrode 4 can be improved. This enables prevention of peeling at the interface B between the first outer electrode 3 and the second outer electrode 4. In other words, the fixation strength between the first outer electrode 3 and the second outer electrode 4 is a fixation strength of the interface B between the first outer electrode 3 and the second outer electrode 4.

The anchor effect resulting from the hard particles 7 is improved with an increase in proportions of the hard particles 7 in the first outer electrode 3 and the interface B. The anchor effect resulting from the hard particles 7 refers to a phenomenon in which the hard particles 7 define and function as an anchor which bonds the first outer electrode 3 and the second outer electrode 4 together and/or a phenomenon in which components of the second outer electrode 4 enter into tiny gaps between the first outer electrode 3 and the hard particles 7 and thus defines and functions as an anchor.

For example, a volume of the first outer electrode 3 and a volume of the hard particles 7 preferably satisfy the following expression (1):

$$1.03 \geq P/V \geq 0.25 \quad (1)$$

where

Figure 4:
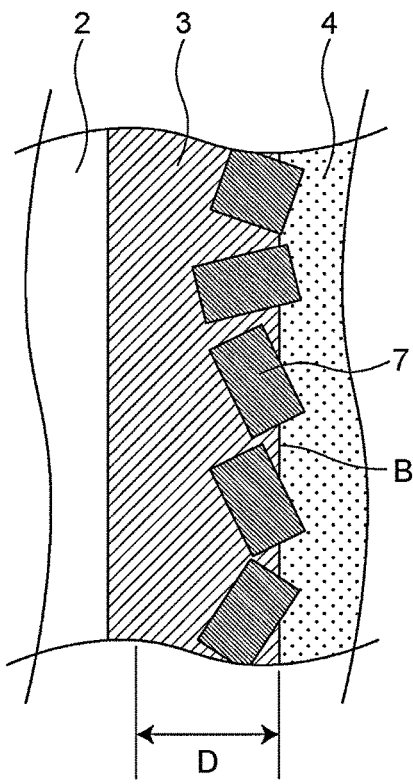
FIG. 4 is a schematic enlarged view of the first outer electrode of the chip ceramic semiconductor electronic component shown in FIG. 3.

P represents the volume of the hard particles 7, and V represents a volume of the first outer electrode 3 which is included in a range from the interface B between the first outer electrode 3 and the second outer electrode 4 to a depth D (FIG. 4) in a direction toward the inside of the first outer electrode 3.

The depth D is determined by about 1.2×an average particle diameter of the hard particles.

An "average particle diameter" of the hard particles 7 is obtained in the following manner. An SEM image including the interface B between the first outer electrode 3 and the second outer electrode 4 is taken. Hard particles 7 with, for example, maximum dimensions not less than about 0.05 μm and not more than about 5.0 μm of hard particles 7 included in a range defined as an area of about 31 μm×42 μm in the obtained SEM image are subjected to image processing to obtain equivalent circle diameters of the hard particles 7, and an average value of the equivalent circle diameters is regarded as the average particle diameter of the hard particles 7.

Figure 6:
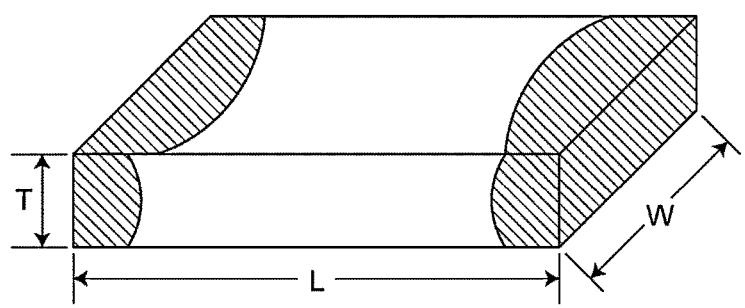
FIG. 6 is a schematic perspective view for explaining chip dimensions prescribed in JIS.

The volume P of the hard particles 7 and the volume V of the first outer electrode 3 to the depth D are obtained by the method described below. FIG. 6 is a schematic perspective view for explaining chip dimensions prescribed in JIS. Referring to FIG. 6, when dimensions of the chip ceramic semiconductor electronic component 10 are expressed as length (L)×width (W)×thickness (T), a section of the chip ceramic semiconductor electronic component 10 that is parallel or substantially parallel to a WL plane (a horizontal plane in FIG. 6) or an LT plane (a plane perpendicular or substantially perpendicular in a longitudinal direction in FIG. 6) and passes roughly through the middle of the chip ceramic semiconductor electronic component 10 is exposed by a method, such as polishing or cutting, for example. A vicinity of the interface B between the first outer electrode 3 and the second outer electrode 4 in the exposed section is measured by scanning electron microscope/energy dispersive X-ray spectroscopy (SEM-EDX). At this time, a range from the interface B to the depth D in the first outer electrode 3 is specified, and quantitative analysis is performed. Respective contained amounts (molar quantities) are obtained for an element (for example, Ag) of the first outer electrode 3 and an element (for example, Al if the hard particle is $Al_2O_3$) defining the hard particle 7. The contained amounts are converted into volumes for Ag and $Al_2O_3$, and the volume P ($\mu m^2$) of the hard particles 7 and the volume V ($\mu m^2$) of the first outer electrode 3 to the depth D are obtained.

With satisfaction of the expression (1), the anchor effect resulting from the hard particles 7 manifests itself prominently, and the advantageous effect of preventing peeling of the first outer electrode 3 and the second outer electrode 4 at the interface B can be improved. Electrical connection between the first outer electrode 3 and the second outer electrode 4 can be sufficiently ensured.

A lower limit for P/V defined in the expression (1) is more preferably, for example, not less than about 0.40, particularly preferably not less than about 0.50. An upper limit for P/V is more preferably, for example, not more than about 0.90, particularly preferably not more than about 0.80.

In another example, an occupied area of the hard particles 7 at the interface B between the first outer electrode 3 and the second outer electrode 4 preferably satisfies the following expression (2):

$$0.90 \geq P_S/(IF_S+P_S) \geq 0.20 \quad (2)$$

0.91 where
- $P_S$ represents an area occupied by the hard particles 7 at the interface B between the first outer electrode 3 and the second outer electrode 4, and
- $IF_S$ represents an area by which the first outer electrode 3 and the second outer electrode 4 are in contact at the interface B between the first outer electrode 3 and the second outer electrode 4.

The area $P_S$ occupied by the hard particles 7 and the area $IF_S$, by which the first outer electrode 3 and the second outer electrode 4 are in contact, are obtained by the method described below. Referring to FIG. 6, when the dimensions of the chip ceramic semiconductor electronic component 10 are expressed as length (L)×width (W)×thickness (T), a section of the chip ceramic semiconductor electronic component 10 that is parallel or substantially parallel to a WL plane (a horizontal plane in FIG. 6) or an LT plane (a plane perpendicular or substantially perpendicular in the longitudinal direction in FIG. 6) and passes roughly through the middle of the chip ceramic semiconductor electronic component 10 is exposed by a method, such as polishing or cutting, for example. A vicinity of the interface B between the first outer electrode 3 and the second outer electrode 4 in the exposed section is observed with a scanning electron microscope (SEM). In an SEM image, a straight line is drawn along the interface B. Let "$P_L$" be a length by which the straight line passes through hard particles, and "$IF_L$" be a length by which the first outer electrode 3 and the second outer electrode 4 are in contact. A total length of the straight line is "$IF_L + P_L$". A similar measurement is performed five times, each at a different position in the same SEM image. The sum of "$P_L$" obtained by the measurements is regarded as the area "$P_S$" occupied by the hard particles 7, and the sum of "$IF_L$" obtained by the measurements is regarded as the area "$IF_S$", by which the first outer electrode 3 and the second outer electrode 4 are in contact.

With satisfaction of the expression (2), the anchor effect resulting from the hard particles 7 manifests itself prominently, and the advantageous effect of preventing peeling of the first outer electrode 3 and the second outer electrode 4 at the interface B can be improved. Electrical connection of the first outer electrode 3 and the second outer electrode 4 can be sufficiently ensured.

A lower limit for $P_S/(IF_S+P_S)$ defined in the expression (2) is more preferably, for example, not less than about 0.25, particularly preferably not less than about 0.30. An upper limit for $P_S/(IF_S+P_S)$ is more preferably, for example, not more than about 0.50, particularly preferably not more than about 0.40.

First Outer Electrode 3

The one pair of first outer electrodes 3 is provided at the respective end surfaces 21 and 21 facing each other of the ceramic body 2. In the present specification, two surfaces perpendicular or substantially perpendicular to a longitudinal direction of the ceramic body 2 are called "end surfaces" 21 and that four surfaces perpendicular or substantially perpendicular to both the end surfaces 21 are called the "side surfaces" 22. Each first outer electrode 3 may be provided on a portion or the entirety of the end surface 21 of the ceramic body 2. The first outer electrode 3 has an ohmic property for the ceramic body 2.

The first outer electrode 3 includes, for example, one selected from the group consisting of Ag, Ni, Cr, Ti, Zn, V, and W.

An area of an end surface 35 of each first outer electrode 3 is, for example, less than about 0.17 mm². The end surface 35 is a first surface of the first outer electrode 3. If the area of the end surface 35 is less than about 0.17 mm², arrangement of the hard particles 7 at the interface B makes it possible to make the fixation strength between the first outer electrode 3 and the second outer electrode 4 higher than in a case where hard particles are not arranged. The advantageous effect of improving the fixation strength between the first outer electrode 3 and the second outer electrode 4 by the hard particles 7 is prominent especially in the chip ceramic semiconductor electronic component 10, in which the area of the end surface 35 of each first outer electrode 3 is not more than about 0.06 mm². Thus, application of the present invention is particularly preferable.

Hard Particle 7

Each hard particle 7 is made of a material harder than at least the first outer electrode 3. This makes it easier to put the hard particles 7 in a state of being partially embedded in a surface of the first outer electrode 3 after provision of the first outer electrode 3.

The hard particles 7 preferably include, for example, a particle made of any one of materials selected from the group consisting of alumina, zirconium oxide, and silicon carbide. Since the materials are hard and are widely used as an abrasive in barrel polishing, the materials can be easily used as the hard particles 7 of the present invention.

Second Outer Electrode 4

The one pair of second outer electrodes 4 covers the first outer electrodes 3 and extends onto the side surfaces 22 of the ceramic body 2. Each second outer electrode 4, in particular, preferably includes a resin electrode layer including a conductive material and a resin.

The resin electrode layer is provided by, for example, curing a flowable resin electrode paste. When the second outer electrode 4 is provided, the first outer electrode 3 is first provided. A portion of each hard particle 7 is partially embedded in the surface of the first outer electrode 3, and the resin electrode paste is then applied so as to cover the surface of the first outer electrode 3 and the hard particles 7 protruding partially from the surface of the first outer electrode 3. There are tiny gaps between the first outer electrode 3 and the hard particles 7, and resin components of the resin electrode paste penetrate into the tiny gaps. When the resin electrode paste is cured, the resin components penetrating in the tiny gaps cure. Since the resin components, which are penetrated in the tiny gaps and cured, define and function as an anchor which firmly bonds the second outer electrode 4 to the first outer electrode 3, the fixation strength between the first outer electrode 3 and the second outer electrode 4 can be further improved. It is thus possible to further prevent peeling at the interface between the first outer electrode 3 and the second outer electrode 4.

Examples of the conductive material used in the resin electrode layer include one or more types of metal particles of Ag, AgPd, Cu, and the like. An average particle diameter of metal particles used as the conductive material is preferably, for example, about 1.0 μm to about 15 μm.

As the resin used in the resin electrode layer, for example, a thermosetting resin is preferable. Examples of the resin include epoxy resins and phenol resins. One type of thermosetting resin is used alone or two or more types of thermosetting resins are used in combination.

Ceramic Body 2

The ceramic body 2 includes a ceramic semiconductor. The type of the ceramic semiconductor is selected in accordance with the desired type (for example, a PTC thermistor, an NTC thermistor, a varistor, or a capacitor) of the chip ceramic semiconductor electronic component 10. For example, in the case of a PTC thermistor having positive resistance temperature characteristics, the ceramic body 2 includes, as a major ingredient, an N-type semiconductor having positive resistance temperature characteristics. The N-type semiconductor is, for example, $((Ba,Pb,Sr,Ca)_{0.0096}Er_{0.004})TiO_3$.

Manufacturing Method

A non-limiting example of a method for manufacturing the chip ceramic semiconductor electronic component 10 according to the first preferred embodiment will be described below. Those skilled in the art upon reading the present disclosure can arrive at a different method capable of manufacturing the chip ceramic semiconductor electronic component 10 according to the first preferred embodiment on the basis of the description.

1. Preparation of Ceramic Body 2

First, a ceramic raw material having a desired composition and optionally any other additive (for example, a semiconductivity-imparting agent, a characteristics-improving agent, or a sintering additive) are weighed in predetermined amounts to prepare a mixed raw material as a raw material for the ceramic body 2. Pure water is added to the mixed raw material, and wet blending and grinding is performed in a ball mill. A ground mixture obtained is calcined to obtain calcined powder. The obtained calcined powder is granulated by adding an organic binder, a dispersant, and pure water and blending in a ball mill. A granulated product obtained is shaped into a green sheet, and the green sheet is fired in the atmosphere after debinding to obtain the ceramic body 2.

2. Formation of First Outer Electrode 3

The first outer electrodes 3 are formed on the end surfaces 21 and 21 of the ceramic body 2. The first outer electrodes 3 can be formed by a thin-film formation method, such as a sputtering method or vapor deposition, for example. Formation by, for example, a sputtering method is particularly preferable.

3. Polishing of Ceramic Body 2

After the formation of the first outer electrodes 3, the ceramic body 2 is subjected to barrel polishing. In the barrel polishing, an abrasive made of the same material as the hard particles 7 is used.

Ridge portions of the ceramic body 2 are removed by the barrel polishing, and a portion of the abrasive (tiny particles with small particle diameters or a fragment of the abrasive) is fixed to the surface of each first outer electrode 3 in a partially embedded state. An abrasive partially embedded in and fixed to the surface of the first outer electrode 3 defines and functions as the hard particle 7. The hard particles 7 have particle diameters much smaller than a central particle diameter of the abrasive to be used in many cases. For example, even if an abrasive having a central particle diameter of about 40 μm to about 60 μm is used, the average particle diameter of the hard particles 7 is, for example, as small as not less than about 0.1 μm and not more than about 1.0 μm. In the case of an abrasive having a large particle diameter, an area of contact with the surface of the first outer electrode 3 is large, and a pressure needed to be put in a state of being partially embedded in the surface of the first outer electrode 3 is considered hard to obtain from a stress provided by the barrel polishing. In contrast, since a tiny particle with a small particle diameter included in an abrasive or a fragment of the abrasive has a small area of contact with the surface of the first outer electrode 3, and a pressure needed to be provided in a state of being partially embedded in the surface of the first outer electrode 3 is obtained from a stress provided by the barrel polishing, the tiny particle or the fragment is presumed to be capable of defining and functioning as the hard particle 7.

4. Formation of Second Outer Electrode 4

After the polishing of the ceramic body 2, the second outer electrodes 4 are formed.

If each second outer electrode 4 is composed of a resin electrode layer including a conductive material and a resin, a resin electrode paste is prepared. The resin electrode paste is prepared by, for example, blending about 69 wt % to about 90 wt % inclusive of the conductive material, about 9 wt % to about 30 wt % inclusive of a thermosetting resin, and about 1 wt % to about 5 wt % inclusive of a diluent.

Each end surface 21 and parts of the side surfaces 22 of the ceramic body 2 are immersed in a resin electrode paste bath. With this immersion, the resin electrode paste covers the first outer electrode 3, and the resin electrode paste extends onto the side surfaces 22 of the ceramic body 2. After the ceramic body 2 is pulled out of the resin electrode paste bath, curing treatment is performed, and the second outer electrode 4 is formed.

Second Preferred Embodiment

A chip ceramic semiconductor electronic component according to a second preferred embodiment of the present invention is different from the first preferred embodiment in that a first outer electrode and a second outer electrode are both configured to have a multilayer structure, and is the same or substantially the same as the first preferred embodiment in the other points.

Figure 5:
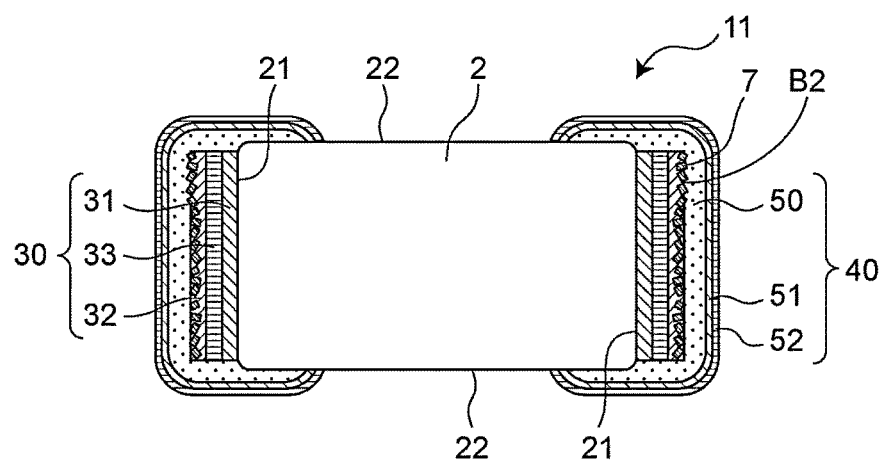
FIG. 5 is a schematic partial sectional view of a chip ceramic semiconductor electronic component according to a second preferred embodiment of the present invention.

A description will be provided with a focus on a first outer electrodes 30 and second outer electrodes 40 which are differences from the first preferred embodiment with reference to FIG. 5.

First Outer Electrode 30

Each first outer electrode 30 has a multilayer structure including a first electrode layer 31 which is in contact with a ceramic body 2 and is in ohmic contact with the ceramic body 2 and a second electrode layer 32 which is provided as an outermost layer farthest from the ceramic body 2 and is in contact with the second outer electrode 40. As shown in FIG. 5, the first outer electrode 30 may further include a third electrode layer 33 between the first electrode layer 31 and the second electrode layer 32.

The first electrode layer 31 is selected from among materials which make ohmic contact with the ceramic body 2. For example, the first electrode layer 31 includes one selected from the group consisting of Cr, Zn—Ag, Ti, W, Zn, and V.

The second electrode layer 32 is formed outside the first electrode layer 31 and the third electrode layer 33. The second electrode layer 32 may have a function of preventing oxidation of the first electrode layer 31 and the second electrode layer 32 and protecting the first electrode layer 31 and the second electrode layer 32 from an external force. The second electrode layer 32 includes, for example, one selected from the group consisting of Ag, Ni, Cr, Ti, Zn, V, and W.

The third electrode layer 33 may be provided to improve adhesion between the first electrode layer 31 and the second electrode layer 32. A material suitable for the third electrode layer 33 is preferably appropriately selected in consideration of adhesion to a material for the first electrode layer 31 and a material for the second electrode layer 32. For example, the third electrode layer 33 may include Ni and one or more selected from the group consisting of Cu, Cr, and V.

Examples of a combination of materials for the multilayer structure with the first electrode layer 31, the third electrode layer 33, and the second electrode layer 32 include Cr—NiCu—Ag.

Second Outer Electrode 40

The second outer electrode 40 has a multilayer structure including a resin electrode layer 50 including a conductive material and a resin, and two layers of metal electrode layers 51 and 52 which cover the resin electrode layer 50.

The resin electrode layer 50 is the same or substantially the same as the resin electrode layer described in the first preferred embodiment.

The two layers of the metal electrode layers 51 and 52 include the first metal electrode layer 51 that covers a surface of the resin electrode layer 50 and the second metal electrode layer 52 that covers a surface of the first metal electrode layer 51.

The first metal electrode layer 51 preferably includes at least one of Ni and Cu, for example. The first metal electrode layer 51 defines and functions to prevent moisture from seeping from an inside of the resin electrode layer 50 at the time of mounting a chip ceramic semiconductor electronic component 11. The first metal electrode layer 51 also defines and functions to prevent moisture from a surrounding environment from entering into the resin electrode layer 50.

The second metal electrode layer 52 preferably includes Sn, for example. The second metal electrode layer 52 enable improvement of solder wettability of the second outer electrode 40 at the time of mounting the chip ceramic semiconductor electronic component 11.

Although the metal electrode layers 51 and 52 include two layers in the example in FIG. 5, only either one may be included.

A hard particle 7 is arranged at an interface between the first outer electrode 30 and the second outer electrode 40, more particularly at an interface B2 between the second electrode layer 32 that is an outermost layer of the first outer electrode 30 and the resin electrode layer 50 of the second outer electrode 40.

Since the hard particle 7 defines and functions as an anchor which bonds the second electrode layer 32 of the first outer electrode 30 and the resin electrode layer 50 of the second outer electrode 40 together, a fixation strength between the second electrode layer 32 and the resin electrode layer 50 can be improved. This enables preventions of peeling at the interface between the second electrode layer 32 and the resin electrode layer 50.

The hard particle 7 is made of a material harder than the second electrode layer 32 that is the outermost layer of the first outer electrode 30. This makes it easier to put the hard particle 7 in a state of being partially embedded in a surface of the second electrode layer 32 after provision of the second electrode layer 32 of the first outer electrode 30.

Manufacturing Method

A non-limiting example of a method for manufacturing the chip ceramic semiconductor electronic component 11 according to the second preferred embodiment, particularly a method for manufacturing the first outer electrode 30 and the second outer electrode 40, will be described below.

1. Preparation of Ceramic Body 2

This section is the same or substantially the same as in the first preferred embodiment, and a description thereof will be omitted.

2. Formation of First Outer Electrode 30

The first outer electrodes 30 are formed by forming the first electrode layers 31, the third electrode layers 33, and the second electrode layers 32 in order on end surfaces 21 and 21 of the ceramic body 2. The first electrode layers 31, the third electrode layers 33, and the second electrode layers 32 can be formed by a thin-film formation method, such as a sputtering method or vapor deposition, for example. Formation by a sputtering method is particularly preferable.

3. Polishing of Ceramic Body 2

After the formation of the first outer electrodes 30, the ceramic body 2 is subjected to barrel polishing. Since conditions and the like for the barrel polishing are the same or substantially the same as in the first preferred embodiment, a description thereof will be omitted.

Ridge portions of the ceramic body 2 are removed by the barrel polishing, and a portion of an abrasive (tiny particles with small particle diameters or a fragment of the abrasive) is fixed to a surface of each first outer electrode 30, that is, the surface of the second electrode layer 32 in a partially embedded state. An abrasive partially embedded in and fixed to the surface of the second electrode layer 32 defines and functions as the hard particle 7. Since a material, a particle diameter, and the like of the hard particle 7 is the same or substantially the same as in the first preferred embodiment, a description thereof will be omitted.

4. Formation of Second Outer Electrode 40

After the polishing of the ceramic body 2, the second outer electrodes 40 are formed. The resin electrode layers 50 are formed so as to cover the first outer electrodes 30.

Since a method for forming the resin electrode layers 50 is the same or substantially the same as the resin electrode layer formation method described in the first preferred embodiment, a description thereof will be omitted.

Additionally, the first metal electrode layers 51 and the second metal electrode layers 52 are sequentially formed so as to cover the resin electrode layers 50. The first metal electrode layers 51 and the second metal electrode layers 52 are preferably formed by, for example, electrolytic plating.

Example 1

(1) Fabrication of Test Sample

A chip PTC thermistor having the structure shown in FIG. 5 was fabricated as a test sample of a chip ceramic semiconductor electronic component.

First, a ceramic raw material, such as $BaCO_3$, $TiO_2$, PbO, $SrCO_3$, or $CaCO_3$, and a semiconductivity-imparting agent, such as $Er_2O_3$, are weighed in predetermined amounts as ceramic raw materials. As the semiconductivity-imparting agent, for example, an oxide of at least one rare-earth element selected from the group consisting of Y, La, Ce, Pr, Nd, Sm, Eu, Gd, Tb, Dy, Ho, Er, Tm, Yb, and Lu, or the like may be used instead of $Er_2O_3$. As a raw material for the ceramic body, for example, a characteristics-improving agent, such as $Mn_2O_3$, or a sintering additive, such as $SiO_2$, may be used in addition to the ceramic raw material and the semiconductivity-imparting agent described above. The weighed raw materials are charged into a ball mill together with a grinding medium (hereinafter also referred to as PSZ balls), such as, for example, partially stabilized zirconia (PSZ), and pure water, and wet blending and grinding is performed. An obtained mixture is calcined at a predetermined temperature (for example, about 1000° C. to about 1200° C.) to obtain calcined powder. The obtained calcined powder is granulated by adding an organic binder, a dispersant, and water and blending with PSZ balls for a predetermined time period. A granulated product obtained was shaped into a green sheet, and the green sheet was fired at a predetermined temperature (for example about 1200° C. to about 1400° C.) in the atmosphere after debinding to form ceramic bodies 2 having various sets of dimensions. The dimensions of the ceramic bodies 2 are shown in Table 1. Five thousand ceramic bodies 2 were fabricated to have the sets of dimensions. First outer electrodes 30 having multilayer structures were provided on end surfaces 21 and 21 of each obtained ceramic body 2 by a sputtering method. Cr, NiCu, and Ag were selected as respective materials for a first electrode layer 31, a third electrode layer 33, and a second electrode layer 32 of each first outer electrode 30, and respective thicknesses of the electrode layers were set at about 0.3 µm, about 1.0 µm, and about 1.3 µm.

After the formation of the first outer electrodes 30, ridge portions of the ceramic body 2 were removed by barrel polishing. At that time, alumina particles with a central particle diameter of about 40 µm to about 60 µm as an abrasive were charged in an amount (about 140 g/pot) twice a normal input (about 70 g/pot) into a pot.

After that, a resin electrode paste for formation of resin electrode layers 50 of second outer electrodes 40 is prepared. The resin electrode paste is a resin-curing Ag paste and is prepared by blending about 70 wt % to about 90 wt % inclusive of a conductive material, such as Ag, AgPd, or Cu, about 10 wt % to about 30 wt % inclusive of a thermosetting resin, such as an epoxy resin or a phenol resin, and about 1 wt % to about 5 wt % inclusive of a diluent. After each end surface 21 and portions of side surfaces 22 of the ceramic body 2 were immersed in a resin electrode paste bath, the ceramic body 2 was pulled out of the resin electrode paste bath, thus applying the resin electrode paste. A resin in the resin electrode paste was cured by heat treatment, and the resin electrode layer 50 was formed. Additionally, a first metal electrode layer 51 made of Ni and a second metal electrode layer 52 made of Sn which cover the resin electrode layer 50 were formed by electrolytic plating to obtain a test sample.

The 0402M size, the 0603M size, the 1005M size, and the 1608M size that are standards prescribed in Appendix A of JIS C 5101-21: 2014 were adopted as test sample sizes shown in Table 1. Length (L)×width (W)×thickness (T) (see FIG. 6) which were dimensions of the ceramic body 2 included in a test sample of each size were set as in Table 1 below. An area (WT area) of an end surface of the ceramic body 2 which was calculated from width (W) and thickness (T) and an area (WT area) of an end surface of the first outer electrode 30 are also shown in Table 1.

TABLE 1

| Size (JIS) | L: length (mm) | W: width (mm) | T: thickness (mm) | WT area (mm$^2$) | WT area of first outer electrode (mm$^2$) |
|---|---|---|---|---|---|
| 0402M | 0.4 | 0.2 | 0.2 | 0.04 | 0.03 |
| 0603M | 0.6 | 0.3 | 0.3 | 0.09 | 0.06 |
| 1005M | 1.0 | 0.5 | 0.5 | 0.25 | 0.17 |
| 1608M | 1.6 | 0.8 | 0.8 | 0.64 | 0.44 |

Each obtained test sample was mounted on a mounting board, and a fixation test was performed.

The fixation test was performed in conformity with section 4.28 in JIS C 2570-1: 2006 "Directly heated negative temperature coefficient thermistors Part 1: Generic specification". In the case of the experimental condition of a holding time period of about 10±1 seconds with about 5 N that is a standard value, a ceramic body may be fractured during a test, a crack may appear from a point of contact with a pushing jig, and only a judgement about whether good (G) or no good (NG) can be made, depending on the sample size. For this reason, a stress to be applied was gradually increased such that quantitative strength comparison was possible, the stress was applied until a test sample was fractured, and the stress at a time point when the test sample was fractured was regarded as a fixation strength of the sample. Here, a fracture is judged to have occurred when the stress reaches a maximum during a transition of displacement.

Figure 7:
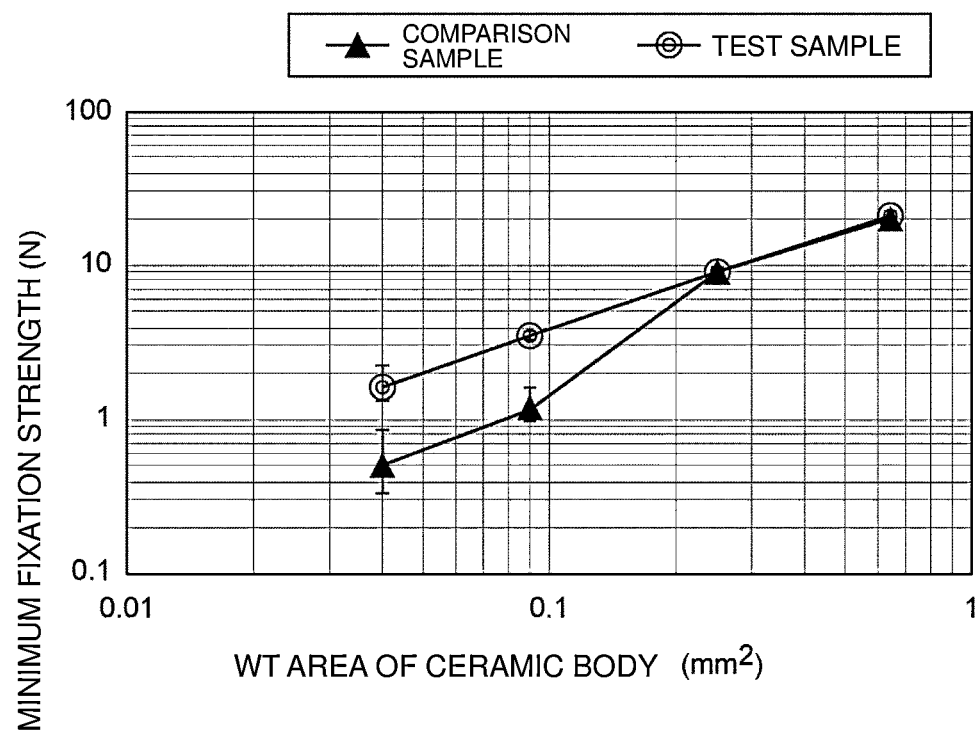
FIG. 7 is a graph showing a change in minimum fixation strength with respect to an end surface area of a ceramic body which is measured in an example.

Three lots of 10 (a total of 30) test samples were fabricated for each size, and tests were performed. Fixation tests are first performed on 10 test samples of the first lot to obtain a fixation strength minimum value. Fixation tests are then performed on 10 test samples of the second lot to obtain a fixation strength minimum value. Fixation tests are then performed on 10 test samples of the third lot to obtain a fixation strength minimum value. An average of the three fixation strength minimum values thus obtained and a maximum-minimum error bar were plotted (FIG. 7). Note that the unit for the vertical axis is newton (N).

Five thousand comparison samples were fabricated, and fixation strengths were measured. The comparison samples were created by the same method as the test samples except that alumina particles with a central particle diameter of about 40 µm to about 60 µm as an abrasive were charged in a normal input (70 g/pot) into a pot in barrel polishing after first outer electrode formation. In the case of a WT area not less than about 0.25 mm$^2$ for the ceramic body 2 (a WT area not less than about 0.17 mm$^2$ for a first outer electrode), there was no dominant difference in minimum fixation strength between test samples (with hard particles 7) and comparison samples (substantially without the hard particles 7). In contrast, in the case of a WT area less than about 0.25 mm$^2$ for the ceramic body 2 (a WT area less than about 0.17 mm$^2$ for a first outer electrode), there was a dominant difference. Especially in the case of a WT area of about 0.09 mm$^2$ for the ceramic body 2 (a WT area of about 0.06 mm$^2$ for a first outer electrode) and a WT area of about 0.04 mm$^2$ for the ceramic body 2 (a WT area of about 0.03 mm$^2$ for a first outer electrode), a fixation strength of each comparison sample was significantly low, and provision of the hard particles 7 allowed great improvement in fixation strength.

A fracture mode refers to a portion where a fracture occurs, and the portion is generally a portion with a lowest strength in a chip. Fracture modes of the comparison samples were fractures at interfaces between first outer electrodes and second outer electrodes. In contrast, fracture modes of the test samples were not fractures at interfaces between the first outer electrodes 30 and the second outer electrodes 40 and were all fractures at the ceramic bodies 2. Note that each fracture mode was confirmed by checking a fractured point with a scanning electron microscope (SEM).

It was discovered from results of EXAMPLE 1 that a fixation strength between the first outer electrode 30 and the second outer electrode 40 can be made higher than a strength of a ceramic body.

Example 2

Five thousand test samples of the size 0603M (Table 1) were fabricated by the same or substantially the same procedure as in EXAMPLE 1 while varying an abrasive amount to be charged at the time of barrel polishing. The abrasive amount is described in Table 2.

No. 2 in Table 2 is a comparison sample having a conventional structure and No. 3 is a test sample fabricated in EXAMPLE 1.

As for the obtained test samples, the amount of hard particles 7 present at an interface B2 between a first outer electrode 30 and a second outer electrode 40, and a fixation strength between a first outer electrode 30 and a second outer electrode 40 were examined.

A contained amount (a volume P) of the hard particles 7 and an amount (a volume V) of the first outer electrode 30 to a depth D were calculated in the following manner.

Each test sample was sealed with resin, and a section of the test sample that was parallel to a WL plane (a horizontal plane in FIG. 6) or an LT plane (a plane perpendicular in a longitudinal direction in FIG. 6) and passing roughly through the middle of the test sample was exposed by polishing. A vicinity of an interface B2 between the first outer electrode 30 and the second outer electrode 40 in the exposed section was measured by an SEM-EDX (FLEXSEM1000 from HITACHI High-Technologies Corporation). Measurement conditions were a low-vacuum mode, a reflected electron image, and an acceleration voltage of about 15 kV.

In the above-described case, quantitative elemental analysis was performed on a range from the interface B2 to a depth of about 2.4 μm in the first outer electrode 30 by EDX. Respective included amounts (molar quantities) were obtained for Ag of a second electrode layer 32 of the first outer electrode 30 and Al that was an element of the hard particles 7 ($Al_2O_3$). The included amounts were converted into volumes for Ag and $Al_2O_3$, and the volume P ($\mu m^2$) of the hard particles 7 and a volume $V_0$ ($\mu m^2$) of Ag included in the range from the interface B2 to the depth of about 2.4 μm were obtained. Here, since only the second electrode layer 32 of the first outer electrode 30 includes Ag, the volume $V_0$ ($\mu m^2$) of Ag can be regarded as a volume of the second electrode layer 32 with a thickness of about 1.3 μm. The volume $V_0$ ($\mu m^2$) of Ag was converted into the volume V ($\mu m^2$) of the first outer electrode 3 from the interface B2 to the depth D using the expression (3) below. Note that an average particle diameter of the hard particles 7 was about 1.0 μm and that D was about 1.2×(the average particle diameter of the hard particles 7)=about 1.2 μm.

$$V = V_0 \times D / (\text{a thickness of the second electrode } 32) \quad (3)$$

That is, the volume V ($\mu m^2$) of the first outer electrode 3 from the interface B2 to the depth D was calculated as (the volume $V_0$ ($\mu m^2$) of Ag)×1.2 (μm)/1.3 (μm).

TABLE 2

| Example No. | 1 | 2 | 3 | 4 | 5 |
|---|---|---|---|---|---|
| Amount of $Al_2O_3$ used in barrel polishing (g/pot) | 0 | 70 | 140 | 300 | 500 |
| $Al_2O_3$/Ag average volume ratio (ave P/V) | 0.00 | 0.15 | 0.26 | 0.41 | 1.03 |

For each type of sample, five samples were observed, and P/V values were obtained. An average value of P/V (ave P/V) obtained from the five samples and a P/V maximum-minimum error bar were plotted along the x axis in FIG. 8.

Each obtained sample was mounted on a mounting board, and a fixation test was performed. Conditions for the fixation test were the same or substantially the same as in EXAMPLE 1. Ten samples were fabricated for each size, and tests were performed. A minimum value from the fixation tests was plotted along the y axis.

Figure 8:
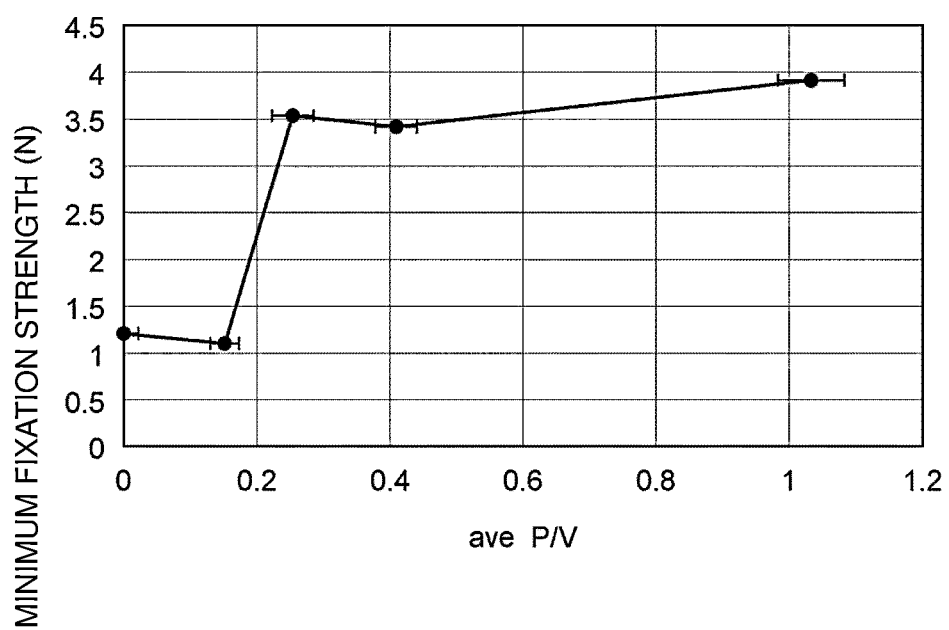
FIG. 8 is a graph showing a change in minimum fixation strength with respect to a percentage of hard particle content which is measured in an example.

It can be seen from the graph in FIG. 8 that a significantly improved fixation strength is achieved for an $Al_2O_3$/Ag average volume ratio (ave P/V) of not less than about 0.25. Fracture modes are not fractures at interfaces between first outer electrodes and second outer electrodes for ratios of not less than about 0.25 and are all fractures at ceramic bodies. For this reason, a fixation strength between a first outer electrode and a second outer electrode could be made higher than a strength of a ceramic body as intended.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A chip ceramic semiconductor electronic component comprising:
   a ceramic body including a ceramic semiconductor, and a first surface and a second surface in contact with the first surface;
   a first outer electrode on the first surface of the ceramic body; and
   a second outer electrode covering the first outer electrode and extending onto the second surface of the ceramic body; wherein
   an area of a first surface of the first outer electrode is less than about 0.17 $mm^2$;
   a hard particle made of a material harder than the first outer electrode is at an interface between the first outer electrode and the second outer electrode;
   the chip ceramic semiconductor electronic component satisfies expression (1):

$$1.03 \geq P/V \geq 0.25 \quad (1), \text{where}$$

P represents a volume of the hard particle; and
   V represents a volume of the first outer electrode included in a range from the interface between the first outer electrode and the second outer electrode to a depth D in a direction toward an inside of the first outer electrode, the depth D being the product of about 1.2 and an average particle diameter of the hard particle.

2. The chip ceramic semiconductor electronic component according to claim 1, wherein the first outer electrode includes at least one of Ag, Ni, Cr, Ti, Zn, V, or W.

3. The chip ceramic semiconductor electronic component according to claim 1, wherein
   the first outer electrode has a multilayer structure including:
      a first electrode layer in contact with the ceramic body; and
      a second electrode layer defining an outermost layer farthest from the ceramic body and in contact with the second outer electrode; and
   the hard particle is made of a material harder than the second electrode layer.

4. The chip ceramic semiconductor electronic component according to claim 3, wherein the second electrode layer includes at least one of Ag, Ni, Cr, Ti, Zn, V, or W.

5. The chip ceramic semiconductor electronic component according to claim 1, wherein the hard particle includes a particle including at least one of alumina, zirconium oxide, or silicon carbide.

6. The chip ceramic semiconductor electronic component according to claim 1, wherein the second outer electrode includes a resin electrode layer including a conductive material and a resin.

7. The chip ceramic semiconductor electronic component according to claim 6, wherein the second outer electrode further includes a metal electrode layer covering the resin electrode layer.

8. The chip ceramic semiconductor electronic component according to claim 1, wherein the area is not more than about 0.06 mm².

9. The chip ceramic semiconductor electronic component according to claim 1, wherein a lower limit for P/V is not less than about 0.40.

10. The chip ceramic semiconductor electronic component according to claim 1, wherein a lower limit for P/V is not less than about 0.50.

11. The chip ceramic semiconductor electronic component according to claim 1, wherein an upper limit for P/V is not more than about 0.90.

12. The chip ceramic semiconductor electronic component according to claim 1, wherein an upper limit for P/V is not more than about 0.80.

13. A chip ceramic semiconductor electronic component comprising:
a ceramic body including a ceramic semiconductor, and a first surface and a second surface in contact with the first surface;
a first outer electrode on the first surface of the ceramic body; and
a second outer electrode covering the first outer electrode and extending onto the second surface of the ceramic body; wherein
an area of a first surface of the first outer electrode is less than about 0.17 mm²;
a hard particle made of a material harder than the first outer electrode is at an interface between the first outer electrode and the second outer electrode;
an occupied area of the hard particle at the interface between the first outer electrode and the second outer electrode satisfies expression (2):

$$0.90 \geq P_S/(IF_S+P_S) \geq 0.20 \quad (2),\text{ where}$$

$P_S$ represents an area occupied by the hard particles at the interface between the first outer electrode and the second outer electrode; and $IF_S$ represents an area by which the first outer electrode and the second outer electrode are in contact at the interface between the first outer electrode and the second outer electrode.

14. The chip ceramic semiconductor electronic component according to claim 13, wherein a lower limit for $P_S/(IF_S+P_S)$ is about 0.25.

15. The chip ceramic semiconductor electronic component according to claim 13, wherein a lower limit for $P_S/(IF_S+P_S)$ is about 0.30.

16. The chip ceramic semiconductor electronic component according to claim 13, wherein an upper limit for $P_S/(IF_S+P_S)$ is than about 0.50.

17. The chip ceramic semiconductor electronic component according to claim 13, wherein an upper limit for $P_S/(IF_S+P_S)$ is about 0.40.

18. The chip ceramic semiconductor electronic component according to claim 13, wherein the first outer electrode includes at least one of Ag, Ni, Cr, Ti, Zn, V, or W.

19. The chip ceramic semiconductor electronic component according to claim 13, wherein
the first outer electrode has a multilayer structure including:
a first electrode layer in contact with the ceramic body; and
a second electrode layer defining an outermost layer farthest from the ceramic body and in contact with the second outer electrode; and
the hard particle is made of a material harder than the second electrode layer.

20. The chip ceramic semiconductor electronic component according to claim 13, wherein the hard particle includes a particle including at least one of alumina, zirconium oxide, or silicon carbide.

* * * * *